April 26, 1927.

E. J. KEARNEY ET AL 1,626,001

MACHINE TOOL DRIVE

Filed Dec. 31, 1923    5 Sheets-Sheet 3

Fig. 4.

INVENTOR.
Edward J. Kearney
Joseph Armitage
Erwin, Wheeler & Hooland
ATTORNEYS

April 26, 1927.

E. J. KEARNEY ET AL

1,626,001

MACHINE TOOL DRIVE

Filed Dec. 31, 1923

Edward J. Kearney
Joseph Armitage
INVENTOR.

BY Erwin, Wheeler & Woolard
ATTORNEYS.

April 26, 1927.

E. J. KEARNEY ET AL 1,626,001

MACHINE TOOL DRIVE

Filed Dec. 31, 1923

Edward J. Kearney
Joseph Armitage INVENTOR.
BY
Erwin Wheeler & Woolard
ATTORNEYS.

Patented Apr. 26, 1927.

1,626,001

UNITED STATES PATENT OFFICE.

EDWARD J. KEARNEY, OF WAUWATOSA, AND JOSEPH ARMITAGE, OF MILWAUKEE, WISCONSIN, ASSIGNORS TO KEARNEY-TRECKER CORPORATION, OF WEST ALLIS, WISCONSIN.

MACHINE-TOOL DRIVE.

Application filed December 31, 1923. Serial No. 683,647.

This invention relates to an improved machine tool drive, and more particularly to means for transmitting power to a machine tool attachment from a source of power which is normally located within or beneath the table, the driving connections being such as to provide not only for the actuation of attachments but also for the establishment of a supplemental drive for table actuation.

It is contemplated that ordinarily the machine tool attachment to be actuated will be mounted upon the machine tool table, and the disclosure herein will be made particularly with reference to such an arrangement. By way of illustration we have shown herein a standard milling machine table equipped with a driving train embodying this invention and carrying a driven attachment commonly known as a universal, spiral cutting, dividing head, which may conveniently take the form of the device disclosed in and forming the subject matter of a companion application filed by E. J. Kearney, April 24, 1923, Serial No. 634,292. It will be noted that any ordinary attachment adapted to be mounted upon a movable table of any machine and requiring power to execute its individual functions may, with advantage, be actuated by the improved mechanism herein disclosed.

It will be noted hereinafter that a complete driving train embodying this invention includes, in its preferred embodiment, features which independently comprise the subject matter of companion applications. In deriving power from the source above referred to as being ordinarily located in or beneath a machine tool table, we preferably employ means disclosed in the application of Joseph Armitage, entitled "Power transmitting mechanism", Serial No. 643,290, filed June 4, 1923. We further employ, in connection with the machine tool drive herein disclosed, a specially designed removable rate changing mechanism.

One of the primary objects of this invention is to provide a novel and improved driving mechanism for the simultaneous or independent actuation of a machine tool table and attachment at a variety of relative speeds.

It is regarded as very important that the mechanism herein disclosed is such that the attachment and the table actuating member may be separably coupled together through one or more rate changers in a single driving train to which power may be applied at either end, whereby a great variety of relative speeds between the table and attachment are possible without the friction loss which would result if power were applied at times, to that end of the train having the relatively slower rate of movement.

Another important purpose of this invention is to confine in small compass a drive for the above enumerated advantages and to completely enclose in a separate housing such portions of the mechanism as are non-essential to the actuation of the table independently of the attachment thereon, and to mount said housing in such a way that it can be detached from the machine tool when it is not in use, thereby promoting safety and convenience of operation.

It will be noted that we contemplate a comparatively great departure from standard machine tool practice in that we propose to provide an unusually complete set of rate changers in a form in which they can readily be removed from, and attached to, the machine tool and will be entirely supplemental to the rate changing means ordinarily provided in a machine tool for controlling table travel. As indicated above, the supplemental rate changing devices will be available not only for the actuation of a table attachment but also for driving the table itself. We contemplate that the supplemental rate changers shall be so designed as to provide for an extremely wide range with very small increments of change, whereby the relative rate of drive of the table and attachment, when both are actuated, may be varied between large limits and with close adjustment to any intermediate rate.

Other objects of this invention are to provide a drive for a variety of attachments; to secure the aforesaid large range of speeds in a rate changing device, and the small increments of change throughout said range, with a simplified mechanism involving comparatively few gears and confined in a relatively small compass and particularly adapted to be used as a supplemental device for attachment to a milling machine table; to provide suitable and improved trips, motion reversers, and controlling means, mechanically and manually actuated, to enable the mechanism to be controlled by hand or power, or both, under the various conditions of use made possible by this invention; and to provide a set of supplemental rate changing devices readily attached and detached from a machine tool table and adapted for co-operation with the special power transmitting mechanism within the table to produce the wide variations in speed of a single driven device, relatively variable speed between two or more driven devices, and adaptability of use contemplated by this invention.

In the drawings.

Like parts are identified by the same reference characters throughout the several views.

Figure 3:
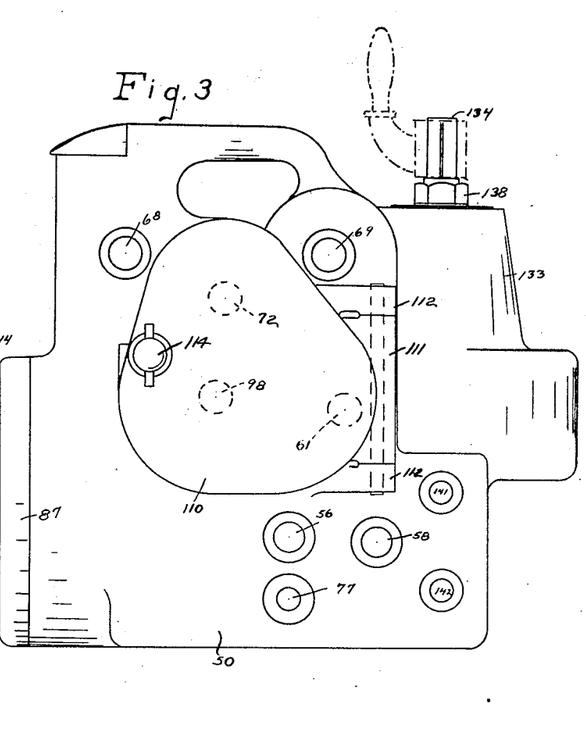
Figure 3 is an end elevation of the housing shown in Figure 2.
Figure 4:
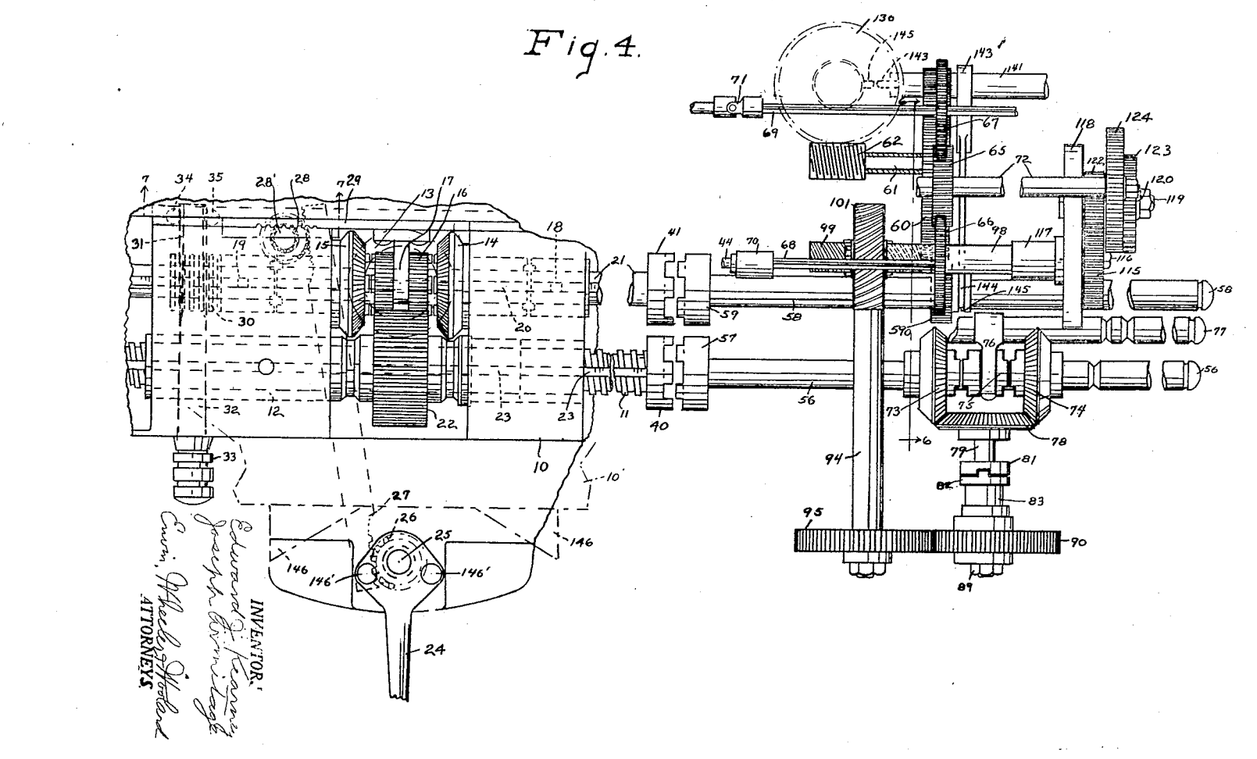
Figure 4 is a developed view in plan of the motion transmitting train in its entirety, including such portions of it as are housed beneath the table and such portions as are contained in the removable housing, independently shown in Figures 2 and 3.

The developed view in Figure 4 does not show the several gears, motion reversers, clutches, etc., in their exact relative locations within the housing at the end of the table nor in their exact relative dimensions. Their relative positions may, however, readily be ascertained by comparing the developed view with other views of the housing in Figures 1, 2, 3, and 10. In the last mentioned views the positions of the several shafts are all located definitely in a manner which will enable those skilled in the art to construct devices embodying this invention. Furthermore, in the developed view we have retained in parallelism those shafts which are parallel in actual practice. We have merely offset laterally certain of the shafts and gears to expose other shafts and gearing beneath those which were offset. The dimensions of certain of the gears have also been changed in the developed view in order to maintain their mesh despite the offset aforesaid and to facilitate an understanding of the relations thereof with other gears. The developed view shown in Figure 4 enables each of the many driving connections hereinafter to be disclosed to be traced readily through the mechanism.

The milling machine column 1, knee 2, driving pulley 3, and feed change gear set 4 are assembled in the usual manner, a telescopic and universally jointed drive shaft 5 is connected at one end to the driven element of the feed change mechanism 4 and has a bearing 6 at its other end adjacent which it carries bevel gear 7. This gear meshes with a gear 8 on a shaft 9 projecting downwardly from the slide 10. Within said slide, motion transmitting mechanism connects shaft 9 with gear 13 in the usual way.

Slide 10 supports table 10′ in which is journaled an actuating screw 11 translating therewith and threaded through nut 12, fixed with reference to the slide.

Within or beneath the table is a source of power which may comprise a bevel gear 13. In mesh with this driving gear are two driven gears 14 and 15 which themselves may be considered driving elements, since from these two oppositely rotative gears is derived all power transmitted through the mechanism of this invention.

Two independent clutches are each adapted to mesh with each of the gears 14 and 15. The first of these clutches comprises a pinion 16 mounted co-axially with gears 14 and 15 and axially shiftable by means of a fork 17 into driven engagement with either of said gears. The other clutch comprises a pair of sleeves 18 and 19 interconnected for unitary movement, preferably by means of a spline 20 which also serves to transmit the rotation of either of them to a power shaft 21 which is journaled for translation with table 10′ parallel to screw 11 and extends axially through gears 14 and 15 and pinion 16. The arrangement is such that by the suitable actuation of the clutch comprising sleeves 18 and 19 motion may be transmitted alternately from either of the gears 14 or 15 to the power shaft 21. Similarly, by the proper axial movement of pinion 16, said pinion may be engaged with either of the gears 14 or 15 to actuate the screw 11 through a gear 22 meshing with the pinion and splined to the screw by means of a key extending into the keyway 23. Gear 22 is independently supported concentrically with the screw in such a way that the screw can freely pass axially through said gear to translate with the table, the gear being positively fixed against translation.

Thus, there is included in the mechanism above described means for driving either the power shaft 21 or the screw 11 in either direction from a single ultimate source of power. In certain of the claims the power shaft and other rotatable parts of the mechanism herein disclosed are generically referred to as rotors.

For reasons hereinafter to be disclosed it is considered very desirable to prevent the simultaneous actuation of the screw 11 and power shaft 21. We have provided, therefore, an interlocking device for the control of levers which actuate the clutches for driving these parts.

The lever controlling the movements of screw 11 is shown at 24. It is mounted for oscillation about a center 25 and is connected with a pinion 26 co-axially with said center. A rack 27 has teeth meshing with said pinion and other teeth meshing with a compound rack gear 28. The smaller element 28′ of the compound rack gear meshes with a rack 29 which carries the shaft and fork 17 by means of which the clutch pinion 16 is reciprocated.

The clutch which includes sleeves 18 and 19 may conveniently be actuated by means of circumferential rack teeth 30 formed in sleeve 19 and meshing with teeth 31 cut axially in a rotative member 32. Member 32 terminates in a handle 33 by means of which it may be oscillated upon its axis. The rack teeth 31 also mesh with vertically reciprocable plungers 34 and 35 which, in the neutral position of the clutch controlling rod 32, stand at an equal height and terminate immediately beneath the surface of rack bar 29. Recesses are formed in said rack bar to receive plungers 34 and 35 when said rack bar is in its neutral position. It will be obvious, however, that if the rack bar is moved to engage the clutch pinion 16 with either of the gears 14 or 15, it will thereupon be impossible to oscillate the controlling lever 32 or to reciprocate the clutch, comprising sleeves 18 and 19, inasmuch as the plungers 34 and 35 will no longer register with the apertures formed to receive them. Similarly, if the rack bar 29 is in its neutral position and the clutch, comprising sleeves 18 and 19, is actuated in either direction, one of the plungers 34 or 35 will be projected upwardly into the aperture formed to receive it in rack bar 29, and said rack bar will thereby be locked against movement in either direction. Thus, the two clutches for respectively actuating in either direction worm 11 and power shaft 21 are interlocked against simultaneous operation.

All of the mechanism thus far disclosed, including the means for driving screw 11 and power shaft 21 alternatively in either direction and the interlocking device for preventing the simultaneous actuation of the screw and power shaft, are more particularly disclosed and separately claimed in the companion application of Joseph Armitage above referred to, and constitute the particular subject matter of said application. They will consequently not be described in greater detail herein.

In practice, the screw 11 and power shaft 21 will project from the end of the table which carries them, and these shafts may conveniently be provided respectively with the terminal clutch elements 40 and 41. Through these clutch elements motion is transmitted to those portions of the mechanism which are extraneous to the table. Mounted upon the table in a position to be driven through the extraneous mechanism aforesaid we have shown a novel type of dividing head which is designated in its entirety by the numeral 43, and includes a power receiving shaft 44, indexing mechanism 45, and a work supporting platen 46 having a spindle 47. This mechanism is disclosed in detail in the companion application of E. J. Kearney, Serial No. 634,292, above referred to, and, inasmuch as it is here illustrated only by way of exemplifying a machine tool attachment requiring power for the performance of its individual functions, it is not thought necessary further to describe the particular structure of the dividing head.

Figure 1:
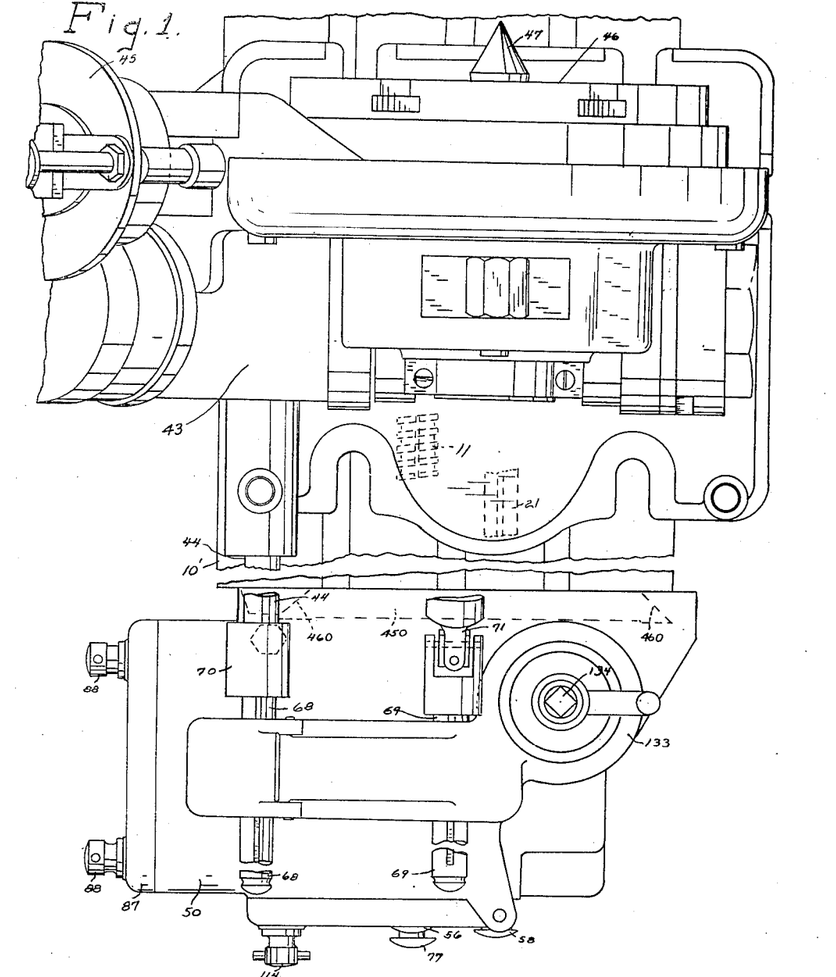
Figure 1 is a plan view, from the view point of an observer at the end of a milling machine table, of a fragment of the end of such a table with a removable housing for rate changing and motion transmitting devices mounted thereon, and an intermediate portion of said table carrying a universal, spiral cutting, dividing head, such as that disclosed in the companion application of E. J. Kearney, Serial No. 634,292, referred to above.
Figure 2:
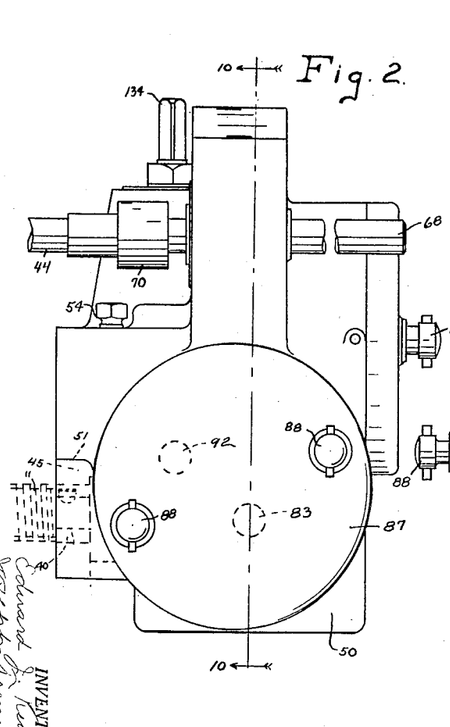
Figure 2 is a side elevation of the removable housing disposed at the end of the table and shown in plan in Figure 1.
Figure 9:
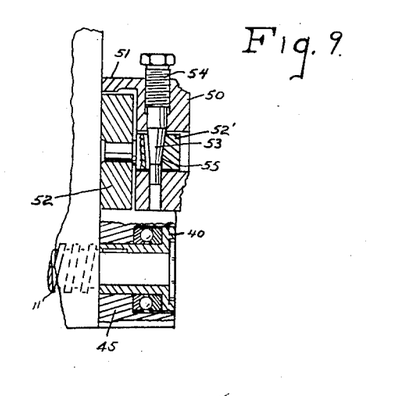
Figure 9 is a sectional view taken on line 9—9 of Figure 8.

At the end of the table at which clutch members 40 and 41 are provided upon the table screw 11, and power shaft 21, respectively, we preferably employ a bracket 450 formed to provide a dove-tailed slide, as shown at 460 in Figure 1. This bracket will preferably be permanently attached to the table for movement therewith. Clutch members 40 and 41 may conveniently be counter-sunk in the end face of the bracket to be flush therewith. The member 40 is so illustrated in dotted lines in Figure 2 and is so shown in Figure 9.

Figure 8:
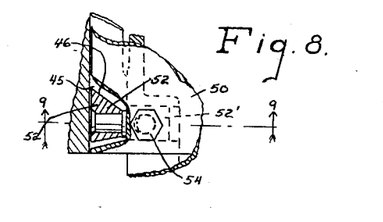
Figure 8 is a detail view in plan of one side of the locking device, whereby the detachable gear housing may be secured to the table, portions of said housing and said attaching means being broken away to expose a horizontal section through the clamp.

The housing for the removable portions of the drive is designated in its entirety by the reference character 50. It is provided with a dove-tailed recess complementary to the bracket and terminating in a shoulder at 51 which prevents downward movement of the housing beyond a predetermined point with reference to the bracket. See Figures 8 and 9. When the housing has been properly positioned upon the bracket it may be secured rigidly in place by means of a clamping device, which includes a movable wall section 52 in the housing, through which a clamping pressure may be exerted upon the bracket by means of a tapered surface 53 on the screw 54 which engages with a wedging action a correspondingly inclined surface 55 upon a member 52' connected with the movable wall portion 52. Obviously, any one of a multiplicity of other clamping devices might be employed to secure housing 50 in position.

*Mechanism within the housing 50.*

When housing 50 has been properly positioned with reference to the table as aforesaid, two shafts therein will be aligned respectively with the table screw 11 and with the table power shaft 20. A shaft 56 axially slidable within the housing carries a clutch element 57 engageable with the complementary element 40 upon the screw 11. A shaft 58 axially slidable within the housing carries a clutch element 59 complementary to and engageable with clutch element 41 carried by the table power shaft 21. Either of these two sets of clutch elements may be engaged and disengaged by a manually effected axial movement of shafts 56 or 58, facilitated by the extension of said shafts through the end wall of the casing, as shown in Figures 1, 3, and 4. If desired, the projecting ends of the shafts may conveniently be formed as shown to facilitate their manipulation. Through mechanism hereinafter to be described shafts 56 and 58 may be interconnected within the housing 50 through a driving train including one or more sets of reduction gearing, and for this reason the interlocking device previously described is preferably employed. From one or more points in the connecting train, power may be taken for the actuation of a table attachment, such as that shown at 43.

The driving connections between shaft 58 and the attachment, being comparatively direct, will be first described.

Fast upon shaft 58 is a gear 590 which meshes with a gear 60 rotatable upon a relatively fixed stud 61. The gear 60 is connected with a worm 62 having a function later to be described. In actual practice the gear 60 and worm 62 may be directly connected for unitary rotation upon stud 61, but for the purposes of the development view shown in Figure 4 it was necessary to illustrate the gear 60 and worm 62 as being connected by a sleeve.

Gear 60 is in operative mesh with a central pinion 65 fast upon shaft 72. Pinion 65 has been called central for the reason that four transmission lines unite therein. The first of these transmission lines comes through gear 60 from table shaft 21 and and has just been described. Two other transmission lines lead from this central gear to two shafts for the actuation of table attachments, and a fourth transmission line connects the gear with the table screw 11. The two lines for the actuation of attachments will next be described.

Pinion 65 meshes with the two driven gears 66 and 67, each of which is independently supported by its own journaled hub directly from the housing. Either, or both, of gears 66 and 67 may be utilized to transmit power to an attachment through the medium of interchangeable shafts 68 and 69 which are inserted from the exterior of the housing into splined relation with either of said gears to receive power therefrom. Shaft 68 may terminate in a coupling member 70 complementary to the coupling member 44 through which the machine tool attachment 43 is driven. Shaft 68, therefore, is adapted particularly for use where the driven element 44 of the attachment is in substantial alignment with the axis of the driving gear 66. Shaft 69 on the other hand is provided with a universal joint at 71 and is thereby adapted, when inserted in either of the gears 66 or 67, to transmit power from said gear to the driven shaft of an attachment even though said shaft is not aligned with the axis of the driving gear.

By making these shafts interchangeable, and by providing two separate driving gears, a wide variety of driving connections may be effected either for the purpose of driving a single attachment in different positions or for the purpose of driving different attachments, or for the purpose of driving two different elements on a single attachment.

Gears 66 and 67 constitute, respectively, the second and third transmission lines which meet in the central pinion 65. The fourth transmission line includes a train extending between said pinion and shaft 56, through shaft 72. This train will now be described, starting from shaft 56.

The bevel gears 73 and 74 are supported from housing 50 by bearings which are independent of those for shaft 56 with which said gears are axially aligned. The gears are preferably free to rotate with respect to said shaft and may be connected therewith only through the medium of a clutch element 75 which is splined to the shaft and may be moved axially thereon by means of a fork 76 carried by a shifting rod 77 extended to the exterior of the housing. As has previously been explained, shaft 56 can be shifted bodily to engage and disengage the complementary clutch members 40 and 57. Irrespective of the engagement or disengagement of said clutch members, the clutch collar 75 may be actuated by the shifting fork 76 through its neutral position into engagement with either of the gears 73 or 74 to connect said gears alternatively to the shaft.

Meshing with the bevel gears 73 and 74 and interconnected with said gears is a bevel gear 78 connected to a short length of shaft 79 which is supported by a bearing sleeve 80 from housing 50. This short length of shaft 79 preferably terminates in a clutch or coupling element 81 with which a similar element 82 may be engaged. The complementary coupling element 82 is connected with a shaft 83 in axial alignment with shaft 79 and gear 78, but it is carried independently of the housing by a suitable bearing 84 in a spider or frame 85 which may be substantially cylindrical in its external contour and is preferably seated within a correspondingly formed recess within the housing, as shown. The spider or frame is maintained in place by means of a cover plate 87 which may be held to the housing by screws 88. When the cover plate is removed, the spider or frame 85 may be bodily withdrawn from the housing, carrying with it the length of shaft 83 and other parts to be described. The purpose of such a withdrawal is to facilitate the change of gears in the depths of the housing which would otherwise be inaccessible.

Figure 10:
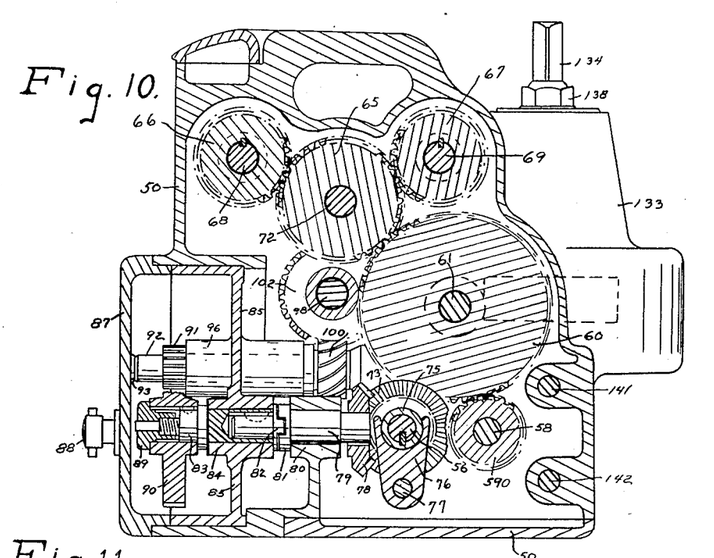
Figure 10 is a section taken on line 10—10 of Figure 2.
Figure 11:
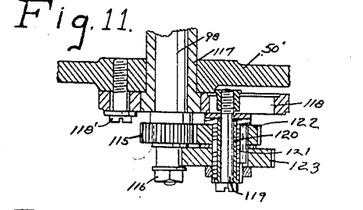
Figure 11 is a sectional view taken on line 11—11 of Figure 12.

Removably secured to shaft 83 through the medium of a jamb nut 89 is a gear 90 which meshes with a gear 91 upon shaft 92. Shaft 92 has its bearing in the frame or spider 85 and is not only removable with the frame but is independently axially removable from such bearings with the gear 91 which may be fast upon said shaft. Gear 91, as shown in Figure 10, is so small as to render it impractical to make this particular gear removable from the shaft 92. A boss 93 upon the cover plate 87 may be utilized, if desired, to provide a thrust bearing for shaft 92. It is contemplated that upon the removal of shaft 92 a substitute shaft 94 may be inserted in place thereof. Said substitute shaft may carry a gear 95 removably keyed thereto to take the place of the gear 91 and to mesh with any gear which may be mounted upon shaft 83 in substitution for gear 90. It will be understood that it is contemplated that each of the gears 90 and 95 shall be interchangeable with others, whereby a variety of relative rates of movement may be produced between shafts 83 and 94. Substitute shaft 94 and the substitute gear 95 are shown in Figure 4. The gear may be secured to the shaft by means of a jamb nut similar to that shown at 89 upon shaft 83.

When the cover 87 is removed, gears 95 and 90 may be withdrawn from their respective shafts and may be interchanged with each other or with other gears adapted to mesh between the centers of said shafts. This change in gear ratios may be accomplished without withdrawing the spider 85 from the housing, provided that the substitute shaft 94 is in place. If shaft 92 is in the bearing 96 of the spider it will be necessary first to withdraw the spider or frame 85 and to replace shaft 92 with the substitute shaft 94. Thereupon any desired change of gearing at the outer ends of shafts 94 may be effected as aforesaid.

Within the housing the extremity of shaft 92 (or 94) is disposed at right angles to an adjacent shaft 98 which is preferably immediately above the axis of bearing 96. Shafts 98 and 92 (or 94) are interconnected by suitable gearing which may take the form of any desired gearing for connecting two shafts so related. It is possible to use a worm upon either of said shafts meshing with a worm gear upon the other, and it is also possible to use spiral gears of any practical proportionate diameter. It will be understood that any gear so used upon either of shafts 92 or 98 will preferably be removably keyed to its shaft in order that other gears of varying ratios may be substituted when desired. Such a substitution is facilitated by the bodily withdrawal from the housing 50 of the spider or sub-frame 85 through the port provided by the removal of cover plate 87, as heretofore described. When said spider is withdrawn, the shaft 92 (or 94) will be carried therewith in bearing 96, and so likewise will gear 99 or worm 100 be withdrawn therewith. It will be understood that the gear 99 or worm 100 (the former being shown in Figure 4 and the latter in Figure 10) are interchangeably keyed to whichever of the shafts 92 and 94 is disposed in bearing 96. Subsequent to the withdrawal of the spider or frame 85 the gear mounted upon shaft 98 will be accessible for removal and change. In Figure 4 a spiral gear 101 is shown upon shaft 98, whereas in Figure 10 a worm gear 102 appears thereon.

Thus far two sets of rate changing means have been described, the first being accessible upon the mere removal of the cover plate 87 and the second being accessible upon the withdrawal of the spider or sub-frame 85.

A third set of rate changing devices are disposed at the end of housing 50 and may be reached through a door 110 which may be wholly removable in the manner of cover plate 87 or may be hinged through the provision of a knuckle 111 upon said door and other similar knuckles 112 upon the wall of the housing and spaced apart to receive knuckle 111, all of said knuckles being connected by a suitable pintle shown in dotted lines in Figure 3. The door may be secured by a latch device, the handle of which is indicated at 114. The rate changing mechanism which is accessible through door 110 comprises a set of motion transmitting gearing connecting shaft 98 with shaft 72, and thereby completing the last of the several drives which unite in the gear 65, above described as being a central gear.

Figure 12:
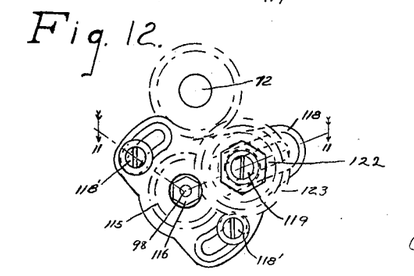
Figure 12 is a detail view in end elevation of one of the sets of rate changing mechanism which are incorporated in the detachable gear housing.
Figure 13:
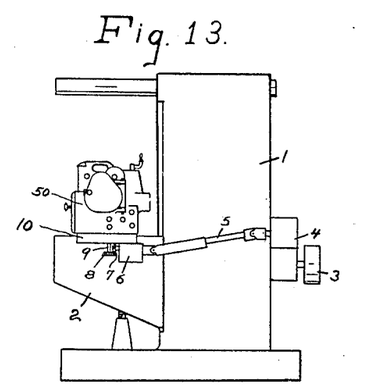
Figure 13 is a diagrammatic side elevation of a milling machine embodying this invention.

At the end of shaft 98 is a gear 115 removably keyed thereto and secured in place by a nut 116. Shaft 98 is journaled in the bearing sleeve 117 upon which, concentrically with the shaft, an arm 118 is mounted for oscillation. It may be secured in adjustment by screws 118′ threaded into the web portion 50′ of the casting 50 which comprises the housing. The screws may conveniently work in arcuate slots in the arm as shown in Figure 12. This arm is preferably provided with a radial slot or with a series of apertures in which a bolt 119 may be clamped to support the tubular stud 120 upon which a sleeve 121 is revolubly mounted. Removably keyed to the sleeve are two gears 122 and 123, the former of which may be made by a proper adjustment of arm 118 and bolt 119 to mesh with gear 115 upon shaft 98. When the parts are properly adjusted as aforesaid, the second gear 123, which is thus secured for rotation with gear 122, may be made to mesh with a gear 124 upon shaft 72 by a suitable oscillation or swinging of the arm 118. Gear 124 is preferably removably keyed to its shaft also, and the several shafts and the sleeve 121 are preferably made of like diameter, whereby all of the several gears 115, 122, 123, and 124 or substitute gears in a great variety are interchangeable to effect a great variety of relative rates of movement between shafts 72 and 98.

It will be obvious from the foregoing that no less than three rate changers are available for the transmission of motion between shafts 56 and 72 in either direction. The first set described above comprises take-off gears on shafts 83 and 94, the second set of change speed gearing comprises take-off gears connecting shafts 94 (or 92) and 98, while the third set, just described above, comprises a set of gearing which connects the shaft 98 with shaft 72. Since this last mentioned shaft is connected through the intermediate gear 65, gear 60, gear 59, and shaft 58 with the table power shaft 21, and since it is also connected through the three sets of change speed mechanism above described and through the reversing device comprising bevel pinions 73, 74, and 78, with shafts 56 and the table screw 11, it will be obvious that means has been described above whereby the table power shaft 21 and the table screw 11 may be interconnected with a great variety of different mechanical advantages through mechanism encased within housing 50 and removably disposed at the end of the machine tool table.

The means above described for interconnecting the table power shaft 21 and the table screw 11 with a great variety of possible changes in mechanical advantage are also adapted to accomplish another object of this invention, in providing for the changes aforesaid with comparatively few separate gears.

The rate changing devices above mentioned have just been grouped into sets and attention has already been called to the fact that the gears of each set are interchangeable with each other and with other gears adapted to operate upon like centers. It is desired now to bring out the fact that the gears are not only interchangeable within each set, but the gears of the third set (as classified above) are also interchangeable with the gears of the first set. Shafts 98 and 72, normally connected by four gears as shown in Figure 4, are so disposed that the distance between their centers corresponds with the distance between the centers of shafts 83 and 92 (or 94). Furthermore, the portions of the shafts to which gears are applied are of like size. The gears which make up the third set are so proportioned that they may be used in pairs upon shafts 83 and 94, and any gears which will mesh between the centers of shafts 83 and 92 (or 94) may also be used directly upon shafts 98 and 72, dispensing with arm 118 and the stud carried thereby. The construction may even be such that shafts 98 and 92, the latter having gear 91 fixed thereon, may be bodily exchanged in their respective bearings, each being substituted for the other. It will, of course, be necessary to remove gears 99 and 101 in order to accomplish the change of shaft. If such gears are restored to the same shafts from which they were removed, a reversal of mechanical advantage between these shafts will obviously have been effected. If, on the other hand, the gears are changed in each case to the substitute shaft, the rate of drive through the second set of change speed gearing will remain unaffected.

Still further changes are made possible in the first set of change speed gearing since that portion of bearing 84 to which the reference characters are applied in Figure 10 is so designed as to receive the oscillatory arm 118 of the third set of change speed gearing. Thus the third set of gearing may be exchanged bodily for the first set when desired.

Through the above described expedients an unusually great variety of speed changes are made possible with the use of relatively few separate gears. The advantage of such an arrangement will be made more obvious hereinafter when the various possible drives through this device are explained. It may suffice to say at this time that under different circumstances it is desirable, during the simultaneous drive of the attachment and the table, so to apply the power to the driving train that motion will always be transmitted from the high speed end of the train to the low speed end thereof. The type of change speed mechanism which comprises the third set, above described, is such that it is necessarily less substantial than the mechanism comprising the first set. Inasmuch as these sets may be exchanged, each for the other, it will be apparent that we are enabled always to use this less substantial device at the high speed end of the train. In other words, if a worm and worm gear are used in the second set to communicate motion in either direction between shafts 92 and 98, the mechanism described above as being disposed in the third set of change speed gearing, can always be utilized to drive the worm rather than to be driven through the worm gear. In this way the strain thereon is minimized and a comparatively light construction is made possible.

Figure 5:
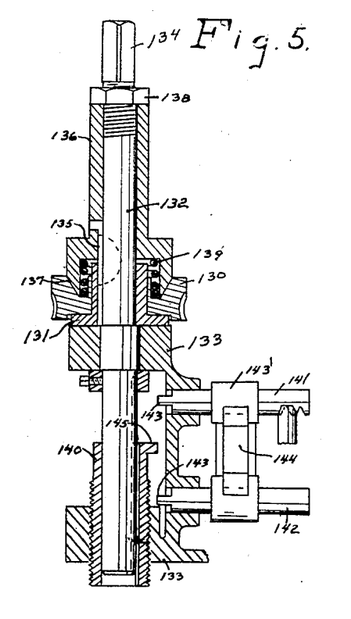
Figure 5 is a detail view of a special power trip device actuated from a portion of the gearing shown in Figure 4.
Figure 6:
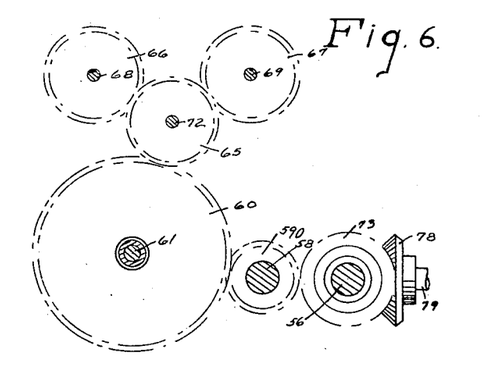
Figure 6 is a section taken on line 6—6 through Figure 4.
Figure 7:
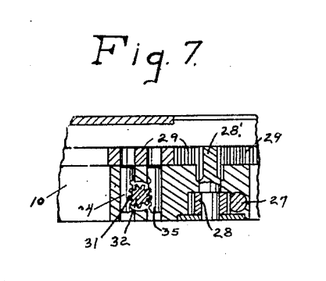
Figure 7 is a detail view on line 7—7 of Figure 4.

The clutch mechanism comprising elements 41 and 59 mounted respectively upon the table drive shaft 21 and upon shaft 58 within the housing have been described heretofore as being manually operable to engage and disengage said shafts, the end of shaft 58 being extended through the wall of the housing for that purpose. These clutch elements may, however, be disengaged through the medium of a power actuated trip which will now be described, and which is best shown in Figures 4 and 5.

A worm 62, which has already been described as being connected for rotation with gear 60, comprises means for actuating the power trip. The worm meshes with a worm gear 130 which is freely revoluble upon a bushing 131 concentric with shaft 132. This shaft is journaled with a portion of housing 50, which may be designated by the separate reference character 133. The shaft is provided with a squared end 134 which projects from the housing and serves to permit the attachment of a crank for the manual actuation of the shaft.

Slidably splined to the shaft through the medium of a key 135 is a sleeve 136 which is provided with a tapered extremity 137 adapted to seat in a complementary recess in the worm gear 130. The tapered portion of the sleeve may be driven into the worm gear by a nut 138 threaded to shaft 132 as shown. When said nut is turned downwardly upon its threads, it forces sleeve 136 into frictional clutching engagement with the worm gear 130, whereby said gear is connected to the shaft for the actuation thereof. When nut 138 is reversely screwed upon the shaft, the gear is unclutched therefrom through the operation of a spring 139 interposed between the sleeve and the gear, whereby the friction surfaces of these members are separated.

Keyed to another portion of shaft 132 is a threaded sleeve 140 which is in threaded engagement with the housing portion 133. As shaft 132 revolves, the sleeve 140 is caused by its threaded engagement with the housing to move axially of said shaft.

Slidable in the housing portion 133 are a pair of spaced rods 141 and 142 which are both connected through the medium of a yoke 143' with a fork 144 which engages a groove 145 which may be formed in the hub of gear 590 upon shaft 58. Thus, the two rods 141 and 142 are connected by means of fork 144 to slide with said shaft for the engagement and disengagement of clutch elements 41 and 59 whereby said shaft is engageable with the table power shaft 21.

The rods 141 and 142 terminate in reduced end portions 143, each of which, in the engaged position of clutch elements 41 and 59, is disposed closely adjacent to the path of sleeve 140 as it moves axially along shaft 132. Said sleeve carries a lug 145 which, during the rotation of said sleeve in its axial travel, will, if said travel is sufficiently long continued, eventually contact with one of the reduced end portions 143 of shafts 141 and 142. The lug 145 and the end portions 143 are so formed that the lug will act upon said portions with the operation of a cam, so that the contact of said lug with either of said portions will result in the simultaneous movement of rods 141 and 142 with shaft 58 in such a direction as will release clutch element 59 from clutch element 41. Obviously, this engagement of the clutch between table shaft 21 and driven shaft 58 may be accomplished regardless of the direction in which the shafts are rotated, since one of the cam-like extremities 143 is disposed at each limit of travel of the sleeve 140. Furthermore, the time of operation of the clutch disengaging movement may be adjusted by releasing shaft 132 from engagement with the driven worm gear 130 and by manually adjusting shaft 132 to any desired degree. Thereupon, when said shaft is re-engaged with worm gear 130, the extent to which the shaft has been adjusted will determine the extent to which the mechanism can be operated before the unclutching movement above described is brought about.

It is contemplated that the above described means for disconnecting the table power shaft 21 from the driving train within housing 50 shall be used principally when the table and attachment are being driven from said power shaft. Under such circumstances the power shaft will ordinarily be the more rapidly operating part of the driving mechanism, and consequently it will be at this point that control of the table movements can most accurately be effected. If, on the contrary, the table screw rather than the power shaft is the more rapidly actuated member and the drive through the mechanism in housing 50 is thus made to take place in the opposite direction from that above considered, the control of table movement can most readily be accomplished from the table itself. For this purpose we may provide, in the usual manner, adjustable dogs 146 upon the forward margin of the table in a position to act upon the one or the other of suitable stop pins 146' carried by control lever 24 to move said lever to its neutral position. Thus, the movement of the table itself may be used to actuate a power trip, whereby the lever 24 which controls the direct actuation of the table screw may be so moved from either of its operative positions as to disengage clutch element 16 from either of the pinions 14 or 15 and thereby to bring the table to rest.

With the mechanism disclosed herein a large number of drives are possible in addition to those customary in machine tool practice. In order that those skilled in the art may appreciate the advantages derived from the use of this invention, certain of the possible driving relations will be described as follows:

Through the mechanism disclosed in the companion application of Armitage above identified, it will be remembered that the table may be power driven in either direction without operating any of the mechanism in the housing 50, and, in fact, without even operating the table power shaft 21. Obviously, this driving train may be used when the housing 50 is not even attached to the table and is also suitable for use when the housing is in place upon the table but when the attachment drive is not needed. Assuming the housing to be in place but no attachment drive to be desired, the operator will ordinarily exert a pull on the end of shaft 56 to disengage said shaft from the extremity of table screw 11 and will then oscillate control lever 24 to set the table in motion in the desired direction. In this situation, none of the mechanism in housing 50 will be operative.

The table power shaft 21 may also be actuated independently of the table screw 11, and through the mechanism contained in housing 50 the motion of the power shaft may be transmitted directly to shafts 68 and 69 for the actuation of attachments without actuating the screw 11. This is useful for machine operation where an attachment drive is desired but power movements of the table are unnecessary. In this second situation, the screw being stationary, the speed of rotation of the attachment is ordinarily sufficiently controlled through the customary change speed mechanism within the driving train of the machine tool itself. Accordingly, no change speed mechanism is provided in housing 50 between shaft 58 and the attachment actuating shafts 68 and 69. Handle 24 being in a neutral position, shaft 56 will be withdrawn or clutch 75 set in neutral to disengage connections to the table screw. This result may also be accomplished by removing one of the gears of the several sets. Shaft 58 will then be projected inwardly and clutched thereby to table power shaft 21 and control handle 33 suitably oscillated to set shaft 21 in motion in the desired direction.

In a third situation, power may be transmitted through table power shaft 21, not only through drive shafts 68 and 69 for the actuation of an attachment but also, through the three sets of reduction gearing and the reversing mechanism in housing 50, to actuate the shaft 56 and the table screw 11 in either direction. Under such circumstances, no change gears being interposed in the drive to shafts 68 and 69, the three sets of change speed gearing above mentioned may be used to drive the table screw at any desired reduced speed relative to the attachment speed. This driving arrangement is useful for spiral cutting, particularly when the lead of the spiral is comparatively very short, as for instance in cutting screw threads, when the travel of the table is comparatively very small during the period in which the work will be making a single revolution. The speed of the power shaft 21 and of the attachment actuating shafts 68 and 69 will then be high as compared to the speed of the screw and, to avoid friction losses, it is very desirable to transmit power from shaft 21 rather than from the screw. Thus, in this third situation shafts 56 and 58 will be clutched to the table screw 11 and table shaft 21 respectively, and the clutch element 75 will be operative to connect shaft 56 to one of the gears 73, 74 to drive the table in the desired direction with respect to the direction of attachment actuation. The entire train will then be set in motion by a suitable oscillation of handle 33.

A fourth situation arises when it is desired to operate the table screw 11 at relatively high speeds as compared with the speeds of the attachment actuating shafts 68 and 69. This is useful in case the work involves a spiral cutting operation in which the lead of the spiral is comparatively long and the table thereby travels a considerable distance while the work is making a single revolution. Under such circumstances the table screw 11 will preferably be primarily actuated and will constitute the high speed end of the train. The drive to shafts 68 and 69 will take place through the three sets of change speed mechanisms above referred to and the gears thereof will be reversed from their positions for such work as was described in the preceding paragraph, whereby the rate of rotation of shafts 68 and 69 can be reduced to any desired ratio with respect to the rate of rotation of the table screw 11. Shaft 56 will be clutched to screw 11 and clutch 75 will be properly engaged as in the third situation described in the preceding paragraph. Shaft 58, however, will be disengaged from table shaft 21 and handle 33 will be set in its neutral position. Control of power at the source will be had through handle 24.

Attention has already been called to the fact that the change gears 100 and 102 are mounted upon shafts which cross each other at right angles and in offset relationship. Due to this fact the use of a worm and worm gear is made possible in this point of the mechanism, and it is contemplated that any relatively great gear reduction will ordinarily be made at this point in the train. Since these gears are interchangeable upon their respective shafts, it is possible to make either end of the train the high speed end thereof. Furthermore, as already suggested above, the set of change speed gearing which includes arm 118 and which has been designated above as the third set, may readily be removed from the location in which said gearing appears in Figure 4, and may be exchanged for the gearing designated herein as the first set. Thus, the comparatively less sturdy gears comprising the third set may always be used upon the high speed side of that comparatively great reduction which occurs in the second set and thereby the gears of the third set may be made to transmit relatively small torque and will have sufficient strength even though they are made of relatively small dimensions. In other words, in the third situation above described, the gears of the third set will ordinarily be used in the position in which they are illustrated in Figure 4, whereas in the fourth situation said gears will ordinarily exchange positions with those of the first set.

From the description of the different driving connections immediately above, the provision of two sets of power trips will have added significance. The dogs carried by the table may of course be used to stop table travel whether or not an attachment is in use and whether or not the housing 50 is carried by the table. When the attachment is in use, however, and is driven through the mechanism herein described, the table dogs will ordinarily be used only in the fourth situation, when the rate of table travel is comparatively high as compared with the rate of rotation of shafts 68 and 69. When the third situation obtains and the reductions made possible through the three sets of change speed gearing herein disclosed are employed to drive the table at comparatively low speeds as compared with the speeds of the attachment drive shafts 68 and 69, the power trip will, under such circumstances, preferably be effected through the medium of the device disclosed in Figure 5.

In the third situation described above, the table power shaft and table screw are interconnected through change speed gearing in housing 50. Thus the advantage of the interlocking mechanism described herein and also in the Armitage companion application will be appreciated. Not only is damage to the transmission mechanism as a whole prevented during the establishment of the drive described above as the third situation, but also at such other times as shafts 21 and 11 may, through accident or design, be interconnected.

The rotary parts of the disclosed mechanism including shafts, gears, and table screw, are generally termed rotors in the accompanying claims.

We claim:

1. In a machine tool, the combination with a reciprocable table and a relatively movable member supported therefrom and arranged for the actuation of a table attachment, of a table actuating member, a power train connecting said members, and means for establishing a plurality of alternative forward driving connections with said power train.

2. In a machine tool, the combination with a power driven element, of a table actuator and an attachment actuator each adapted for independent connection with said element for primary operation therefrom, and power transmission mechanism potentially operative to connect said actuators, whereby either may be driven from the other, each being independently operable when said mechanism is inoperative.

3. In a machine tool, the combination with a reciprocable table, of a relatively movable member supported therefrom and adapted to actuate table attachments, an actuating member for said table, a power train connecting said members, two transmission elements provided with clutch devices for alternative engagement with said train for the simultaneous operation of said members, said train including a clutch intermediate said clutch devices, whereby said members are independently operable from respective elements.

4. In a machine tool, the combination with a reciprocable table and a relatively movable member supported therefrom and arranged for the actuation of a table attachment, of a table actuating member, a power train connecting said members, a plurality of different sets of driving connections to said power train, and clutches selectively controlling the alternative engagement of said driving connections with said power train, whereby to provide a plurality of forward driving connections for the simultaneous operation and control of said table and an attachment driven from said first mentioned member.

5. In a machine tool, the combination with a reciprocable table and a table actuating member, of a relatively movable member adapted to actuate a table attachment, a driving train connecting said members, a plurality of transmission elements alternatively connectable with said train for the simultaneous actuation of said members, and reversible driving connections from each of said elements to said train, whereby said table and member may be simultaneously actuated from either element in either direction.

6. In a machine tool, the combination with a reciprocable table and an attachment embodying a relatively movable member, of a pair of transmission elements interconnected for opposite movement, a pair of rotors each in potential power receiving relation to each of said elements, and a motion transmitting train including said rotors and having a portion intermediate said rotors connected to said member, one of said rotors being operable to actuate the table, and said train being interruptible intermediate said member and said last mentioned rotor, whereby said member and said table may be simultaneously actuated in either direction from either rotor and may be independently actuated from particular rotors.

7. In a machine tool, the combination with a reciprocable table and an attachment embodying a relatively movable member, of two transmission elements, a table actuator and a power train including said actuator and provided with clutches upon either side thereof for engaging with said elements to receive motion therefrom, said train including a connection for motion transmission to said member, and a motion reverser intermediate said actuator and said member, whereby said actuator and said member may be simultaneously operated from either of said elements and in either relative direction irrespective of the element from which the train is driven.

8. In a machine tool, the combination with a table attachment embodying a supporting member and a member rotatable with respect thereto, of a motion reverser having a neutral position, and a driving train including the motion reverser and adapted to receive power from either end, said train being provided with means for driving one of said members, whereby said last mentioned member may be actuated either through the motion reverser or exclusive thereof.

9. In a machine tool, the combination with an attachment embodying a plurality of relatively movable members, of a pair of motion reversers, a driving train connecting said reversers and adapted intermediate said reversers to actuate one of said members, and means for applying power to said train through either of said reversers for driving the last mentioned member.

10. In a machine tool, the combination of an attachment embodying two relatively movable members and two motion reversers, a driving train connecting said reversers and operable from either end in either direction and including an intermediate motion reverser, means for actuating one of said members from a point in said train between said reverser and one end of the train, and means for applying power to either end of said train, whereby the actuated member may be driven through or exclusive of said third reverser.

11. In a machine tool having a movable table, the combination with a power driven element and a motion transmission train including a table actuating rotor and a motion reverser, of reversible transmission means for connecting said element with said train at points spaced to include between them said rotor and reverser.

12. In a machine tool, the combination with a reciprocable table and an attachment embodying a relatively movable member; of a source of power; and a driving train including in series motion reversing means, driving connections for said table, a clutch, driving connections for said member, and a second motion reversing means; said train being potentially operative from said source of power through either of said reversers, whereby said table and said member may be driven simultaneously through either reverser when said clutch is engaged and may be driven independently through a particular reverser when said clutch is disengaged.

13. In a machine tool having a movable table and a movable attachment shaft, the combination with a power driven element; of a motion transmission train including in series a table actuating rotor, a motion reverser having a neutral position, and an actuator for said shaft; and reversible transmission means for connecting said element with said train at either of two points spaced to include said rotor, reverser, and actuator, whereby said table and attachment shaft may be driven simultaneously in either direction and either relative direction from either of said points and may each be driven independently from one of said points.

14. In a machine tool, the combination with a movable table and a table actuator, of a rate changer removably attached to said table, and two sets of driving connections for said table actuator, respectively inclusive and exclusive of said rate changer.

15. In a machine tool, the combination with a reciprocable table of a rate changer removably attached thereto; a source of power; and motion transmitting connections potentially including a motion reverser, table actuating means, and said rate changer in series and adapted to be driven from said source of power from either end, whereby said table may be actuated from said motion reverser exclusively of said rate changer or through said rate changer exclusively of said motion reverser.

16. In a machine tool, the combination with an attachment embodying two relatively movable members, of a rate changer, two motion reversers, a driving train including the rate changer and one of said reversers and adapted to actuate one of said members, and a second driving train including the other reverser and adapted to actuate the same member exclusive of the rate changer.

17. In a machine tool, the combination with a reciprocable table, of an attachment-actuating member, a rate changer removably fixed to the table, a driving train including the rate changer and arranged to actuate the table, and a second driving train including the rate changer and arranged to actuate said member.

18. In a machine tool, the combination with a reciprocable table, a table actuator, and a power train leading to said actuator; of a rate changing device removably secured to said table and arranged to receive power from said train; and a driven shaft adapted to actuate a table attachment and potentially connected with said train through said device and provided with alternative connections with said train independently of said device.

19. In a machine tool having a movable table, a table actuator and a rotor adapted for the actuation of a table attachment, the combination of a power driven element, of a pair of motion transmission trains each adapted for primary actuation from said element and including respectively said actuator and said rotor, and motion transmitting mechanism including change speed gearing and available for the potential connection of said trains.

20. In a machine tool, the combination with two driven parts, of a rate changer potentially connected with each of said parts, a source of power, and power transmitting trains potentially connecting said source with each of said driven parts, whereby either may be primarily driven, the other being driven through said rate changer.

21. In a machine tool, the combination with a reciprocable table having an actuating member, of an attachment-actuating member, a rate changer, and means for establishing two independently reversible driving connections each adapted for the primary actuation of one of said members and for the actuation of the other through said rate changer.

22. In a machine tool, the combination with a reciprocable table having an actuating member, of a relatively movable member adapted for attachment operation, a rate changer, and means for establishing a plurality of independently reversible driving connections each adapted for the primary actuation of one of said members and for the simultaneous actuation of the other member through said rate changer; said rate changer and said other member being disengageable from said connections, whereby either of said members may be independently actuated.

23. In a machine tool, the combination with a reciprocable table and an attachment embodying a relatively movable member, of a rate changing device incorporating change speed mechanism and a motion reverser, a source of power, table actuating means, potential driving connections respectively leading to said means and to said member from said source, and driving connections potentially connecting said means with said member through said motion reverser and said change speed mechanism.

24. In a machine tool, the combination with a reciprocable table and an actuator therefor, of a rate changing device including an attachment-actuating member and a set of rate changing mechanism connected therewith, a source of power, and means for completing first and second driving connections from said source of power to said actuator and said member, respectively, and a third driving connection between said actuator and said member through said rate changing mechanism, each of said driving connections being independently reversible.

25. In a machine tool, the combination of a reciprocable table, a relatively movable member, two sets of driving connections each adapted to actuate both the table and the member, and two power trips each adapted to interrupt power transmission through one of said sets of connections.

26. In a machine tool, the combination with a reciprocable table, a table actuator and a member adapted for the actuation of a table attachment, of power transmitting connections adapted for the primary actuation of said table actuator and said member respectively, rate changing mechanism, means for driving either said actuator or said member from the other through said rate changing mechanism when the other is primarily actuated, a power trip adapted to interrupt the drive to said table actuator when said member is primarily actuated, and a second power trip adapted to interrupt the drive to said table actuator when said table actuator is primarily actuated.

27. In a machine tool, the combination with a reciprocable table and a relatively movable member, of means for establishing a plurality of driving connections adapted for the simultaneous actuation of said table and member and connections for the independent operation of said table and said member, and power trips for the interruption of each of said driving connections.

28. In a machine tool, the combination with a reciprocable table, of a rate changer, table actuating means, a source of power, power transmitting mechanism for connecting said source with said means exclusively of said rate changer, power transmitting mechanism for connecting said source to said means through said rate changer, and a power trip operable for the interruption of power transmission through each of said mechanisms.

29. In a machine tool, the combination with a table, a table actuator, and a member adapted to actuate a table attachment; of a source of power, a power transmission train potentially connected with said source at a plurality of points and including in series with and between said points said member, a motion reverser and said actuator; and a plurality of power trips operative to control power transmission through said train from either of said points.

30. In a machine tool, the combination with a screw-actuated table and a table support, of a member for the operation of a table attachment, and two sets of driving trains originating in said support and leading to said member, one of said trains being inclusive of said screw and the other train being exclusive thereof.

31. In a machine tool, the combination with a screw-actuated table and a table support having a source of power therein, of a relatively movable member supported from the table, a rate changer, and two driving trains each leading from said source to said member, one of said trains including said screw and said rate changer, the other of said trains being exclusive of both.

32. In a machine tool, the combination with a reciprocable table and a table support, of an attachment operating member; a source of power within the support; a table actuator; and a power transmission train including said table actuator and said member and means for delivering power from said source thereto at a plurality of points.

33. In a machine tool, the combination with a table and a table support, of a relatively movable member, a table actuator, a power train connecting said actuator with said member and including reduction gearing of reversible mechanical advantage intermediate said actuator and member, a source of power, and means for operatively driving said train from said source of power on either side of said reduction gearing.

34. In a machine tool, the combination with a reciprocable table and a relatively movable member adapted for the operation of a table attachment, of a table actuator, transmission mechanism connected with said actuator and said member and including change speed mechanism providing for the simultaneous operation of said actuator and said member with either at a relatively higher rate of speed than the other, a source of power, and a plurality of power transmission trains potentially connecting said source of power with said transmission mechanism upon either side of said speed change mechanism, whereby power may be applied primarily to the high speed side thereof.

35. In a machine tool, the combination with a table provided with an actuating screw and a rotatable member adapted for the actuation of a table attachment, of a source of power, a clutch controlled train potentially connecting said source of power with said screw, a clutch controlled train potentially connecting said screw with said member, said last mentioned train being adapted to transmit power in either direction at variable reduced speeds, and a clutch controlled power transmission train potentially connecting said source of power with said member, whereby said screw may actuate said member or be actuated therethrough.

36. In a machine tool, the combination with a movable table and a table actuator, of a rotor supported from the table, and a rate changing device removably secured to the table and unitarily including change speed gearing engageable and disengageable with said rotor and said actuator without disturbing the setting of said gearing.

37. In a machine tool, the combination with a table, a table screw and a relatively movable member supported from the table, of a rate changing device removably attached to the table and adapted to provide for a plurality of rates of motion transmission at a plurality of different settings, clutch means for the operative engagement of said screw with said device, and clutch means for the operative engagement of said member with said device, said clutch means being operative for engagement and disengagement without affecting the setting of said device, whereby the removal and replacement of the device is facilitated.

38. In a machine tool, the combination with a reciprocable table and an actuator therefor, of a rotor journaled in the table, an attachment embodying a relatively movable part, a rate changer removably secured to the table, motion transmission means for separably connecting said rate changer with said rotor and with said actuator to transmit motion from the rotor to the actuator, and means for acuating said part from said rotor, all of said means being adapted to permit of the detachment of said rate changer, and said rate changer being bodily detachable from the table without disturbing its setting.

39. In a machine tool, the combination with a reciprocable table and two rotors journaled therein, of a relatively movable part adapted for attachment actuation, a rate changing device removably secured to the table and including two members interconnected through change speed mechanism, means for engaging and disengaging each of said rotors with one of said members without affecting said mechanism, and a motion transmitting train separably connecting one of said members with said part.

40. In a machine tool, the combination with a table, a rotary actuator therefor and a part adapted to transmit motion to a table attachment, of change speed mechanism, a frame for the unitary support of said mechanism and detachably mounted upon the table, motion transmitting connections for operatively connecting said part with said actuator through said change speed mechanism, a rotor associated with the table, and motion transmitting connections for operatively connecting said rotor with said actuator through said change speed mechanism, said connections being separable to permit of the bodily removal of said frame and mechanism.

41. In a machine tool, the combination with a reciprocable table and two rotors journaled therein, of an attachment embodying a relatively movable part, a rate changing device removably secured to the table and including two members interconnected through change speed mechanism, means for engaging and disengaging each of said rotors with one of said members without affecting said mechanism, a motion transmitting train separably connecting one of said members with said part, a source of power, and means for connecting said source alternatively with said rotors, whereby either may be primarily actuated for the operation of the other through said change speed mechanism, and said part may be primarily actuated or actuated through said change mechanism.

42. In a machine tool, the combination of a reciprocable table and a relatively rotatable member supported therefrom, driving rotors respectively for said table and said member, power transmission mechanism including a train adapted to transmit power to one of said rotors through the other, and a motion reverser in said train.

43. In a machine tool, the combination with a reciprocable table and an actuator therefor, of an attachment embodying a relatively movable member supported from said table, a driving train potentially operative to connect said actuator with said member, a source of power potentially operative to actuate said train, and a power trip structurally independent of the table and the attachment actuated from said train, said power trip being adapted to render said source of power inoperative for the actuation of the train.

44. In a machine tool, the combination with a reciprocable table and an actuator therefor, of a relatively movable member adapted to actuate a table attachment, a housing removably fixed to the table, a power trip and a motion reverser within said housing, a power train potentially connecting said actuator with said member through the motion reverser, a source of power, motion transmitting connections including a clutch between said source of power and said train, and means controlled by said trip for disengaging the clutch and said connections.

45. In a machine tool, the combination with a reciprocable table and an actuator therefor; of a relatively movable member adapted to actuate a table attachment; a housing removably secured to the table; a power trip mechanism, a rate changing mechanism and a motion reverser within said housing; a power train connecting the table actuator with said member through the rate changing mechanism and reverser, and a driving connection for the actuation of said train arranged to be interrupted by said trip.

46. In a machine tool, the combination with a reciprocable table having a transmission rotor journaled therein, of a housing removably fixed to the table and embodying a retractible transmission member, and means for aligning said housing with said table, with said rotor and said member in potential power transmitting relation.

47. In a machine tool, the combination with a reciprocable table and a relatively movable member adapted to actuate a table attachment, of a table actuator, a reversible power transmission train leading to said actuator, automatic trip mechanism motivated from the table and adapted to interrupt said train, a second transmission train potentially connected with the table actuator and said member for the simultaneous actuation thereof, and a power trip mechanism adapted to receive motion from said second train and adapted for the interruption of said second train.

48. In a machine tool, the combination with a table provided with a screw for the actuation thereof, of a plurality of driving trains connected with said screw at different points, and a plurality of power trips associated with different trains and adapted to interrupt the power transmission through their respective trains.

49. In a machine tool, the combination of a reciprocable table, a housing removably fixed thereto, a table actuator, a power transmission train within said housing and potentially connected with said actuator, power trip mechanism within said housing arranged to be motivated from said train and to interrupt said train, and means driven from said train for the actuation of a table attachment.

50. In a machine tool, the combination with a reciprocable table and a transmission element journaled therein, of a housing embodying a transmission member, means for mounting said housing upon said table with said member aligned with said element, and complementary clutch devices connected respectively with said member and with said element and operatively associated when said housing is mounted on said table for the engagement and disengagement of power transmitting connections between said member and said element.

51. In a machine tool, the combination with a power transmission train including a rate changer, of elements upon each side of said rate changer connected to said train to be driven thereby, a source of power, and clutches alternatively operable for connecting said source of power with said train at either of two spaced points embracing said rate changer between them.

52. In a machine tool, the combination of a power transmission train including change speed mechanism adjustable to provide for speed reductions from either end thereof, a source of power, and clutch controlled driving connections potentially available for connecting said source of power alternatively with either end of said mechanism, whereby said power may be applied to the end of said mechanism having the relatively higher speed.

53. In a machine tool, the combination with a movable table and a power train including a table actuator and a removable portion connectable in series therewith, of a power trip device arranged to be driven by the removable portion of said train, and a frame means supporting said device and said removable portion for unitary connection with and removal from said table, said trip being adapted when in use to interrupt motion transmission through said train to said actuator.

54. In a machine tool, the combination with a power driven element, a feed change mechanism connected therewith, a reciprocable table and a table actuator, of a transmission train potentially connecting said mechanism with said actuator whereby said table may be driven from said source at a variety of feed rates determined by said mechanism, a rate changer, a supplementary transmission train including said rate changer and adapted to be substituted for a portion of said first mentioned train for modification of the effect on said table of said mechanism, and clutch means adapted to render said train portion and said supplementary train selectively operable whereby to exclude or include said rate changer in the drive to said table.

55. In a milling machine, the combination with a reciprocable table and a spiral cutting attachment embodying a work supporting spindle, of a power driven member, a set of change speed gearing including a pair of end elements, a first motion transmission train including a table actuator and potentially connected with one of said elements, a second motion transmission train potentially connecting the other of said elements with said spindle, whereby said spindle and said actuator may be driven simultaneously at a variety of relative speeds, a third motion transmission train potentially connecting said member with said first train, and a fourth motion transmission train potentially connecting said member with said second train, said third and fourth trains being alternatively operable whereby power may be applied at either end of said gearing set for the simultaneous drive of said spindle and actuator as aforesaid.

56. In a milling machine, the combination with a reciprocable table and a spiral cutting attachment embodying a work supporting spindle, of a power driven member, a set of change speed gearing including a pair of end elements, a first motion transmission train including a table actuator and potentially connected with one of said elements, a second motion transmission train potentially connecting the other of said elements with said spindle, whereby said spindle and said actuator may be driven simultaneously at a variety of relative speeds, a third motion transmission train potentially connecting said member with said first train, a fourth motion transmission train potentially connecting said member with said second train and clutch controlled motion reversing means for controlling the direction of motion transmission through each of said third and fourth trains.

57. In a milling machine having a table, the combination with a table actuator, a rotor adapted for the operation of a table attachment, and a set of change speed gearing; of a set of motion transmission mechanism including a motion reverser and connecting said actuator, said gearing and said rotor together in series; a power driven element, and a pair of alternative driving trains connecting said element with said mechanism respectively on opposite sides of said gearing; each of said trains embodying clutch controlled motion reversing means, whereby said rotor and said actuator may be driven through either train in either direction and in either relative direction.

58. In a machine tool having a reciprocable table, the combination with a table actuator and a spiral cutting attachment including a rotatable spindle, of a rate changing device, a power transmission mechanism connecting said table and said spindle through said device, a power driven element, and a plurality of transmission trains each potentially connecting said element with said mechanism and each including a shiftable clutch adapted to interrupt power transmission through its train and a power trip associated with each clutch.

59. In a machine tool having a reciprocable table, the combination with a table actuator having a clutch element connected therewith, of a rotor adapted to provide power for the operation of a table attachment, a rate changing device, a power transmission mechanism connecting said rotor and said actuator through said device, a power driven member, a plurality of transmission trains adapted for the transmission of power from said member to said mechanism, one of said trains being provided with a clutch element, a plurality of clutch elements operatively connected with said mechanism to receive power from said trains and to connect said mechanism with said actuator, together with power trips controlling a plurality of said clutch elements, said power trips and the clutch elements controlled thereby being operative to select which of said trains shall operatively connect said mechanism with said power driven member.

60. In a device of the character described, attachment actuating means comprising a power driven element, a pair of rotors operatively connected with said element for simultaneous rotation, and shafts connected with each of said rotors and respectively adapted for actuating engagement with attachment elements approximately aligned with the axes of the respective rotors.

61. In a device of the character described, means for attachment actuation including a driving gear, a plurality of driven gears meshed therewith and having splined bores, a plurality of shafts interchangeably fixed in the bores of said driven gears, each shaft being bodily shiftable for connection with each of said gears, and bearings providing a support for each of said driven gears independently of said shafts.

62. In a machine tool having a reciprocable table, the combination with a table actuator and a power driven member journaled in the table, of a transmission mechanism in part detachably supported from the table and having portions adapted to connect said member with said actuator when so supported, said mechanism including a plurality of rotatable gears having axes spaced apart, and a plurality of shafts respectively driven from one or the other of said gears and adapted for actuating engagement with one or another of rotatable table attachment members having axes approximately aligned with the respective axes of said gears.

63. In a machine tool having a reciprocable table, the combination with a table actuator and a rotor mounted for translation with the table, of a transmission gear set operatively connecting said rotor with said actuator, a plurality of gears in mesh with a gear of said set, and a plurality of devices each having a portion engaging one of the last mentioned gears and adapted for actuating engagement with an attachment element, one of said devices being flexible to provide for material misalignment between the axes of the gear with which it is associated and the element driven thereby.

64. In a machine tool having a reciprocable table, the combination with a table actuator and a rotor mounted for translation with the table, of a transmission gear set operatively connecting said rotor with said actuator, a plurality of gears in mesh with a gear of said set, and a plurality of interchangeable devices each providing for simultaneous power engagement with one of the last mentioned gears and with a rotatable attachment member, one of said devices being adapted to engage a member and a gear when the respective axes are aligned, and the other of said devices being adapted to provide for simultaneous engagement as aforesaid irrespective of whether such a member is aligned with the gear to which it is connected by said device.

EDWARD J. KEARNEY.
JOSEPH ARMITAGE.